(12) United States Patent
Omann

(10) Patent No.: US 8,382,362 B2
(45) Date of Patent: Feb. 26, 2013

(54) METHOD OF MAKING PAVING COMPOSITION WITHOUT ADDING ASPHALT CONTENT OIL OR MINIMIZING ADDITION

(76) Inventor: James S. Omann, Albertville, MN (US)

( * ) Notice: Subject to any disclaimer, the term of this patent is extended or adjusted under 35 U.S.C. 154(b) by 695 days.

(21) Appl. No.: 12/608,539

(22) Filed: Oct. 29, 2009

(65) Prior Publication Data

US 2011/0100257 A1    May 5, 2011

(51) Int. Cl.
    *B28C 5/46* (2006.01)
(52) U.S. Cl. .............................................. 366/7; 366/24
(58) Field of Classification Search ........... 366/7, 22–25
    See application file for complete search history.

(56) References Cited

U.S. PATENT DOCUMENTS

| | | |
|---|---|---|
| 12,696 A | 4/1865 | Russell |
| 170,745 A | 12/1875 | Kruse |
| 283,212 A | 8/1883 | Cranson |
| 307,820 A | 11/1884 | Tiffany |
| 1,113,229 A | 10/1914 | Lyle |
| 1,238,117 A | 8/1917 | Dupuy |
| 1,312,986 A | 8/1919 | Hoffman |
| 2,105,759 A | 1/1938 | Stevenson |
| 2,124,934 A | 7/1938 | Urschel |
| 2,141,662 A | 12/1938 | Ossign et al. |
| 2,217,118 A | 10/1940 | Jesson et al. |
| 2,209,036 A | 1/1943 | Beardsley |
| 2,394,760 A | 2/1946 | Felton |
| 2,491,079 A | 12/1949 | Bestland |
| 2,941,079 A | 12/1949 | Bestland |
| 2,518,237 A | 8/1950 | Inskeep |
| 2,597,374 A | 5/1952 | Richey |
| 2,617,210 A | 11/1952 | Thebiay |
| 2,635,884 A | 4/1953 | Christiansen |

(Continued)

FOREIGN PATENT DOCUMENTS

| | | |
|---|---|---|
| FR | 1254880 | 2/1961 |
| SU | 602640 A1 | 4/1978 |

(Continued)

OTHER PUBLICATIONS

ASTM International; Standard Practice for Preparation of Viscosity Blends for Hot Recycled Bituminous Materials; D 4887-99 (2003); 3 pages; ASTM International 100 Bar Harbor Drive, PO Box C700, West Conshohocken PA 19428-2959, United States.

*Primary Examiner* — David Sorkin
(74) *Attorney, Agent, or Firm* — Gerald E. Helget; Briggs and Morgan, P.A.

(57) ABSTRACT

An improved method of making hot mix asphalt, without adding virgin asphalt concrete oil, includes several steps: adding gravel to a container; and heating and rotating the gravel in the container to a suitable temperature for creating the hot asphalt mix. While heated gravel rotates in the container, processed shingles, having a predetermined %/w of AC oil (20%/w on average), are added to a mixing auger along with at least 1 to 2 parts of rejuvenating oil per 100 parts of the processed shingles. The processed shingles and rejuvenating oil are mixed together for about 10 to 20 seconds in the mixing auger creating a slurry of rejuvenated shingles. The slurry of rejuvenated shingles from the mixer auger are then released into the heated and rotating gravel in the container, forming hot mix asphalt with a total oil content of between about 4%/w to 8%/w of the hot mix asphalt, advantageously without adding virgin asphalt concrete oil.

4 Claims, 1 Drawing Sheet

U.S. PATENT DOCUMENTS

| | | |
|---|---|---|
| 3,003,265 A | 10/1961 | Lutiens |
| 3,011,220 A | 12/1961 | Keller et al. |
| 3,082,828 A | 3/1963 | Schindelka |
| 3,100,540 A | 8/1963 | Deaver et al. |
| 3,307,277 A | 3/1967 | Kondracki |
| 3,557,877 A | 1/1971 | Hoffman |
| 3,596,764 A | 8/1971 | Smith |
| 3,643,821 A | 2/1972 | Viel |
| 3,682,396 A | 8/1972 | Whitney et al. |
| 3,709,441 A | 1/1973 | Hessner et al. |
| 3,765,490 A | 10/1973 | Logue |
| 3,823,881 A | 7/1974 | Grob |
| 3,887,141 A | 6/1975 | Francis |
| 4,215,949 A | 8/1980 | Gabriel, Jr. |
| 4,222,851 A | 9/1980 | Good et al. |
| 4,226,552 A | 10/1980 | Moench |
| 4,236,675 A | 12/1980 | Bladykas |
| 4,238,241 A | 12/1980 | Schneider |
| 4,252,487 A | 2/1981 | Jeppson |
| 4,269,693 A | 5/1981 | Hastie |
| 4,303,507 A | 12/1981 | Smith |
| 4,319,856 A | 3/1982 | Jeppson |
| 4,373,961 A | 2/1983 | Stone |
| 4,411,585 A | 10/1983 | Quinn |
| 4,504,149 A | 3/1985 | Mendehall |
| 4,511,284 A | 4/1985 | Sterner |
| 4,549,834 A | 10/1985 | Allen |
| 4,580,732 A | 4/1986 | Mantell |
| 4,619,550 A | 10/1986 | Jeppson |
| 4,706,893 A | 11/1987 | Brock |
| 4,726,846 A | 2/1988 | Jackson et al. |
| 4,729,180 A | 3/1988 | Hendricks |
| 4,744,693 A | 5/1988 | Smith |
| 4,756,484 A | 7/1988 | Bechler et al. |
| 4,790,717 A | 12/1988 | Anderson |
| 4,808,421 A | 2/1989 | Mendenhall et al. |
| 4,848,679 A | 7/1989 | Blumer |
| 5,017,230 A | 5/1991 | Hopkins et al. |
| 5,027,906 A | 7/1991 | Jeannotte et al. |
| 5,061,500 A | 10/1991 | Mendenhall et al. |
| 5,082,187 A | 1/1992 | Kirchoff et al. |
| 5,098,025 A | 3/1992 | Drouin et al. |
| 5,173,115 A | 12/1992 | Glynn, Jr. et al. |
| 5,201,472 A | 4/1993 | Brock |
| 5,217,530 A | 6/1993 | Grzybowski |
| 5,223,032 A | 6/1993 | Gaudio et al. |
| 5,236,497 A | 8/1993 | Grzybowski |
| 5,241,764 A | 9/1993 | Modig |
| 5,242,493 A | 9/1993 | Glynn, Jr. et al. |
| 5,249,750 A | 10/1993 | Gundlach et al. |
| 5,262,240 A | 11/1993 | Dunning et al. |
| 5,337,965 A | 8/1994 | Chiovitti |
| 5,340,038 A | 8/1994 | Omann |
| 5,340,391 A | 8/1994 | Grzybowski |
| 5,344,485 A | 9/1994 | Glynn, Jr. |
| 5,348,418 A | 9/1994 | Campbell |
| 5,378,079 A | 1/1995 | Omann |
| 5,385,426 A | 1/1995 | Omann |
| 5,386,947 A | 2/1995 | Omann |
| 5,397,389 A | 3/1995 | Glynn, Jr. |
| D361,772 S | 8/1995 | Hulsey |
| 5,451,003 A | 9/1995 | Omann |
| 5,511,899 A | 4/1996 | Pavelek, II |
| 5,564,885 A | 10/1996 | Staben, Jr. |
| 5,664,348 A | 9/1997 | Omann |
| 6,186,700 B1 | 2/2001 | Omann |
| 6,209,236 B1 | 4/2001 | Omann |
| 6,588,973 B1 | 7/2003 | Omann |
| 2010/0064937 A1 * | 3/2010 | Harmon et al. ............ 106/273.1 |

FOREIGN PATENT DOCUMENTS

| | | |
|---|---|---|
| SU | 1599086 A1 | 10/1990 |

\* cited by examiner

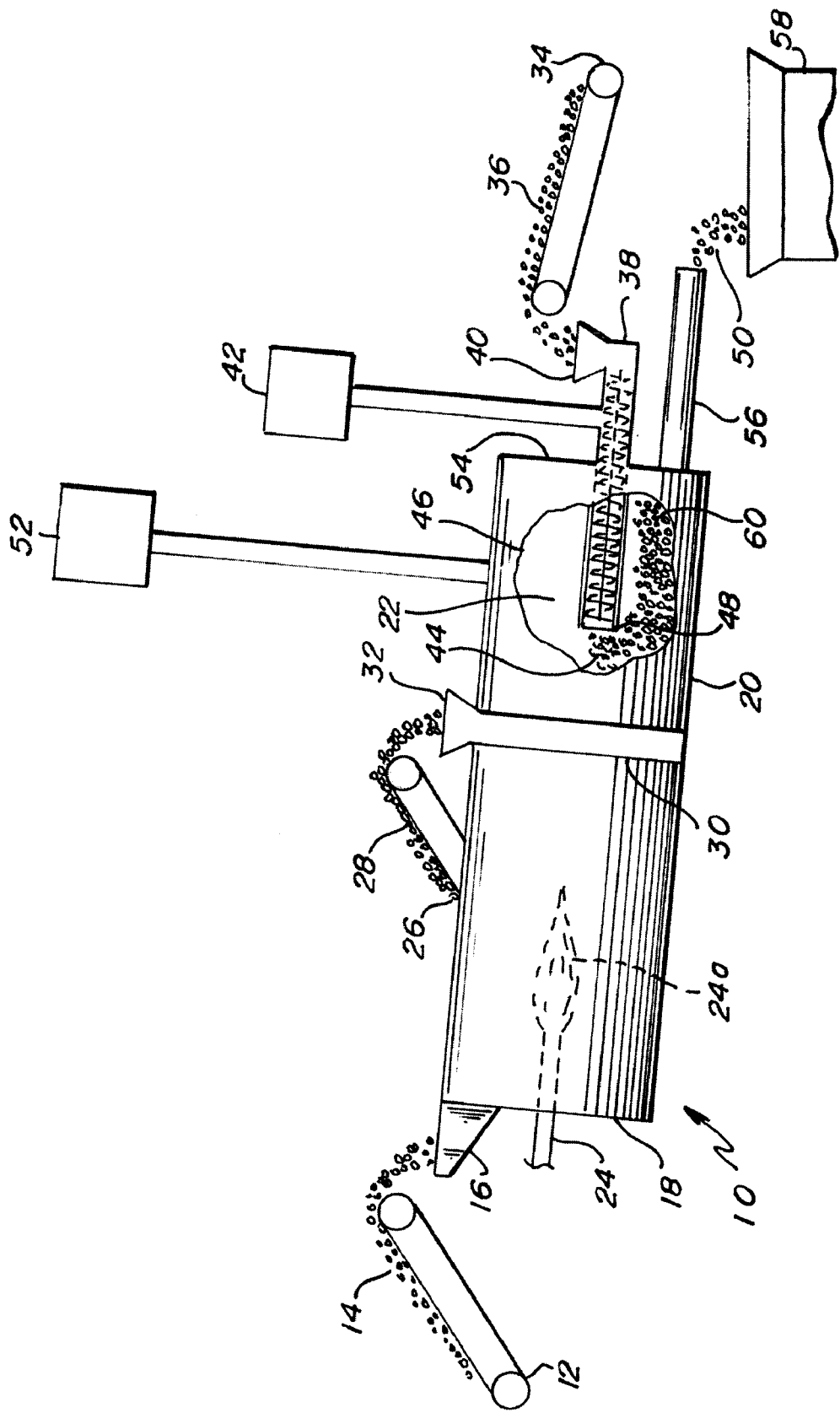

METHOD OF MAKING PAVING COMPOSITION WITHOUT ADDING ASPHALT CONTENT OIL OR MINIMIZING ADDITION

BACKGROUND OF THE INVENTION

This invention generally relates to the recycling and use of roofing waste, including shingles, tar paper and portions thereof with gravel to make a pavement composition. More specifically, the invention relates to the use of recycled asphalt shingles, or a blend of recycled asphalt shingles and recycled asphalt product in a novel method of making a pavement composition that does not require the addition of asphalt concrete oil (AC oil or virgin AC oil) apart from recycled products containing AC oil to make hot mix asphalt, or in the alternative, minimizes the addition of AC oil necessary to make hot mix asphalt.

Methods and apparati for manufacturing asphalt paving compositions for roadways and the like are well known. Virgin aggregate is utilized, which is largely comprised of crushed rock, small rock, and sand generally one inch in diameter and down to a sieve size of 200. Three quarter inch in diameter is often preferable. Typically, virgin aggregate is heated between 220° to 350° F. and dried in a rotating drum. Asphalt or asphalt-concrete oil is utilized with various penetration numbers ranging from 85 to 150, and which is also heated to a range of 280° to 350° F. The heated aggregate is then mixed with liquid asphalt in a proportion typically of five to six percent asphalt by weight. The paving composition is then hauled with trucks to the job site and dumped into a paving vehicle. The paver lays the hot mix out level to a desired thickness on top of a graded gravel surface of a suitable evaluation and smoothness. Thereafter the new pavement is compacted with a roller to the desired density.

Roofing materials, including shingles, tar paper and portions thereof, also utilize asphalt. The asphalt is commonly an asphalt-concrete oil ("AC oil") which is heavy and tar-like. Shingles are composed of a mat that may either be fiberglass or of a paper felt-like material. Initially the paper felt-like material is soaked with a light saturine oil, whereas fiberglass is not. Thereafter, a layer of asphalt-concrete oil is applied thereto. Next a layer of lime dust is placed or dusted thereon. Another layer of AC oil is applied afterwhich a rock layer is applied. Thereafter, the entire composition is run through rollers.

Considerable roof waste (RARW—Recycled Asphalt Roofing Waste; or RAS recycled asphalt shingles) is associated with the manufacture of new shingles, which may approximate one hundred million squares annually. A square is one hundred square feet of shingles. Each shingle has three tabs cut out. Each cutout tab measures one-quarter inch by five inches. The three discarded tabs (RAS) represent approximately two and a half percent of each new shingle which is discarded. When old shingles and tar paper are removed from old construction, the one to three layers of shingles are all considered waste and are to be disposed of. Thus old shingle materials, also RARW, represent an even larger amount of waste associated with shingle materials.

Shingles typically have 17-30% w of asphalt oil of the total shingles weight. An average asphalt or weight to total shingle weight is 20%.

Methods and apparati have been disclosed by which old shingles and shingle material have been attempted to be recycled, such as those shown in U.S. Pat. Nos. 4,222,851; 4,706,893; 4,726,846; 5,201,472; 5,217,530; and 5,236,497. Illustratively, the '893 patent shows a method and apparatus wherein recycled shingles may be used in an asphalt plant mixed with heated and dried aggregate and liquid asphalt to form an asphalt paving composition. However, these prior methods of creating pavements and apparati have not been commercially successful for various reasons and especially due to their inability to handle shingles without clogging or plugging up apparati.

Prior art pavements utilizing RARW or Recycled Asphalt Roofing Waste are plagued with the two basic problems of air voids and stabilization. Air voids generally may be thought of as air pockets in the pavement. The air pockets must not be too tight or there will not be enough room to allow the pavement to move or slightly expand during freezing. If the air voids or air pockets are too loose, the pavement will be highly susceptible to water. Air voids in the range of two to eight percent are ideal and the prior art mixtures have had problems in attaining this acceptable range.

With respect to stabilization or firmness of the pavement material, the pavement material must not be too firm or it will not be workable in application as a pavement. Conversely, the material must have some degree of firmness or it will not set up for traffic use and will result in rutting. A stabilimeter value of 800 to 3000 is acceptable and the prior art pavement mixtures and materials have had difficulty in consistently reaching this range.

The aggregate utilized is of a range of size from one inch to two hundred sieve size. The aggregate's porosity may also vary greatly. Furthermore, the aggregate may carry water or a significant amount of moisture into the mixture which causes problems. The condition of the RARW or shingle materials greatly affects the mixture. Older shingle materials commonly are oxidized and may have a significantly reduced AC oil content. Also, shingle materials may carry moisture, which also poses the problem described above. Some of these problems may be solved by conceivably superheating the mixture. Emulsifiers may be used for RARW having 10% or greater water weight of the total RARW weight.

The inventor obtained U.S. Pat. Nos. 6,186,700 and 6,588,973. These patents disclosed and claimed methods of manufacturing and applying a pavement and patch material for roadways, driveways, walkways, patch for potholes and like surfaces, including the steps of reducing recycled asphalt roof waste to granules, adding aggregate and other solid recyclable materials to the granules, adding rejuvenating oil, adding emulsifier, adding asphalt concrete oil, adding anti-strip additives, adding liquid silicone, mixing the composition, heating the composition, applying the composition to the roadway or the like and compacting a new paving material. All patents referred to herein this application are incorporated herein as though repeated herein.

In the hot mix asphalt (HMA) industry, there are two types of asphalt plants that make the bituminous product. There is a mix drum apparatus and a batch plant, both use a particular conventional sequence of events to produce the product HMA. First, the gravel is heated. Then processed shingles and recycled asphalt products (RAP) are added to the heated gravel, allowing time for the hot gravel to activate the asphalt concrete oil (AC oil) in the processed shingle/RAP mixture. Next, additional AC oil, not contained in the processed shingle/RAP mixture or processed shingles, and other oil products (such as rejuvenating oils) are added to make the HMA.

The conventional method does not extract the most useable asphalt concrete oil from the processed shingles or processed shingles/RAP mixture. Thus, the conventional method can be wasteful.

Another problem is heat loss occurs when making (or manufacturing) hot mix asphalt in the conventional method. Since the gravel is heated first, before addition of the processed shingles or processed shingle/RAP mixture, additional time and heating are necessary to activate the AC oil to be useable.

Another problem with making hot mix asphalt according to the conventional method is that rejuvenating oil, emulsification oil, liquid silicone and antistrip agents are added in the last step. This makes the conventional method inflexible in that these substances are the last step.

There is a need in the hot mix asphalt industry for an improved method of making hot mix asphalt that increases extraction of useable AC oil, minimizes heat loss in the making of HMA, and eliminates or minimizes addition of a separate asphalt concrete oil, and allows for more flexible addition of emulsification oil and antistrip agents during the manufacture of the pavement composition.

SUMMARY OF THE INVENTION

An improved method of making hot mix asphalt, without adding virgin asphalt concrete oil, includes several steps: adding gravel to a container; and heating and rotating the gravel in the container to a suitable temperature for creating the hot asphalt mix. While heated gravel rotates in the container, processed shingles, having a predetermined %/w of AC oil (20%/w on average), are added to a mixing auger along with at least 1 to 2 parts of rejuvenating oil per 100 parts of the processed shingles. The processed shingles and rejuvenating oil are mixed together for about 10 to 20 seconds in the mixing auger creating a slurry of rejuvenated shingles. The slurry of rejuvenated shingles from the mixer auger are then released into the heated and rotating gravel in the container, forming hot mix asphalt with a total oil content of between about 4%/w to 8%/w of the hot mix asphalt, advantageously without adding virgin asphalt concrete oil.

A principal object and advantage of the present invention of making hot mix asphalt is without adding asphalt-concrete oil.

Another object and advantage of the present invention is that Recycled Asphalt Product (RAP) can be added to the heated gravel. After that heated mixture reaches a suitable temperature to activate some of the AC oil in the RAP, the slurry of rejuvenated shingles is added into the heated mixture. In other embodiments, asphalt-concrete oil, can be added as needed, to obtain a total oil content of between about 4%/w to 8%/w of the hot mix asphalt. The addition of the asphalt-concrete oil of the invention is minimized when contrasted to the conventional treatment.

Another object and advantage of using the method of making hot mix asphalt, according to the invention, antistrip agents or emulsification oil can be added during any of the above steps except heating the aggregate to better control where they are needed.

BRIEF DESCRIPTION OF THE DRAWINGS

FIG. 1 shows an embodiment of a mix drum apparatus for creating hot mix asphalt for use as a repair material or patch for potholes or as a paving for roadways.

DETAILED SPECIFICATION

Referring to FIG. 1, the apparatus and method used for creating a hot mix asphalt (HMA) without the need of additional asphalt concrete oil or minimizing the need for additional asphalt concrete oil is described in relation thereto. FIG. 1 is an embodiment of a mix drum apparatus 10 using the method of making hot mix asphalt disclosed in the application. The mix drum apparatus 10 has a rotating drum 20.

A modification to the mix drum apparatus 10 in FIG. 1 is the inclusion of the rejuvenating oil tank 42 in communication with a mixer auger to allow rejuvenated oil and processed shingles 36 to mix into a slurry before releasing the slurry of rejuvenated shingles into the heated gravel 14 or heated gravel and RAP inside the rotating drum 20.

However, the same method of making or manufacturing a hot mix asphalt, disclosed in the application, can be used within a batch plant, as it is the timing and step of enhanced extraction of the AC oil from the processed shingles and release of the slurry into the heated gravel, that is significant.

The timing of the step for addition of processed shingles and rejuvenating oil according to the invention, represents an important improvement for extraction of asphalt concrete oil to minimize or eliminate the need for additional virgin asphalt oil. This results in a beneficial cost saving for manufacturers of hot mix asphalt.

By mixing the RAS (recycled asphalt shingles) with rejuvenating oil (REJUV), creating the desired slurry product, prior to insertion into the mixing process to release the AC Oil in the RAS, the loss of heat is minimal when adding the RAS slurry to the heated gravel because you do not need to rely solely on the heated gravel to activate the AC oil in the RAS. RAP, if added, creates a product that evenly disperses through the HMA, effectively creating a better and more evenly mixed final product. When using a high AC Oil content released in the slurry of rejuvenated shingles with or without RAP, the created slurry will flow and cover the heated gravel so well, it effectively replaces the need to use new AC Oil. Also, increasing the amount of RAS can be done to cut back on adding new AC oil.

By changing the mixture order in this way, you can also change the order in which other products (i.e. anti-strip, liquid silicone, or emulsifiers) are added in the method. That is, other products can be added to the shingle slurry.

First, the gravel 14 is introduced into the mix drum apparatus 10. A first conveyor 12 leads from a storage bin (not shown) containing gravel 14 to a receiving trough 16 on the gravel receiving end 18 of the mix drum apparatus 10. The receiving trough 16 opens into a rotating drum 20 having a hollow interior 22. A burner 24 extends into the rotating drum 20. The burner flame 24(a) heats gravel 14 in the hollow interior 22 of the rotating drum 18. The gravel should be between 250-350° F.

Second, the recycled asphalt pavement (RAP) 28 may be optionally introduced into the drum mix apparatus 10. A second conveyor 26 leads from a RAP storage bin (not shown) containing RAP 28 to a drum collar 30 with an intake portal 32. The RAP collar 30 fits around the rotating drum 20 and communicates with the interior of the rotating drum 22 so that the intake portal 32 accepts RAP 28 dropping from the second conveyor 26 into the rotating drum 22. RAP 28 mixes with the gravel 14 being heated in the rotating drum 20.

Third, the rejuvenated shingles slurry is introduced into the mix drum apparatus 10. A third conveyor 34 leads from a processed shingles bin (not shown) containing processed shingles 36 to a mixing auger 38 with an auger intake opening 40 and a hollow auger interior [not shown]. A rejuvenating oil tank 42 communicates with the hollow auger interior [not shown] to allow the addition of measured portions of rejuvenating oil. The processed shingles 36 and rejuvenating oil are mixed in the auger 38 for an adequate amount of time, typically about 10-45 seconds.

Processed shingles 36 that are used in hot mix asphalt often have an AC oil from about 17% to about 30%. The age, location of the shingles, etc. can make a difference in the content of the AC Oil in shingles. On the average, processed shingles are about 20% AC oil. The AC Oil of the processed shingles is determined before the addition of the rejuvenating oil. For every 100 parts of processed shingles, one to two parts of rejuvenating oil is added to create the slurry. In other words, one to two parts of rejuvenating oil for 20 lbs of AC oil contained in the RAS. If the weight of AC oil is known in the RAS, the rejuvenating oil to be added is 10-20% of the AC oil known weight. Using more rejuvenating oil will create a finished mix that will be soft, tender, pliable, not suitable for roads but satisfactory for light patch work. Various petroleum products may be used as a rejuvenating oil to include fuel oil, kerosene, mineral spirits, gasoline, flux oil, mist oil, used motor, hydraulic or heat exchanger oil and the like.

The slurry of rejuvenated shingles 44 (created by mixing and time) are released from the auger exit portal 48 in to mix with the heated gravel 14, or heated gravel mixed with RAP 60. Alternatively, the slurry may be fed into drum 20 by way of drum collar similar collar 30. The heated gravel and rejuvenated shingle slurry mixture, with or without RAP, create the hot mix asphalt 50 with a predetermined oil content suitable for repair material or patch for potholes or as a paving for roadways.

The predetermined total oil content suitable for hot mix asphalt for repair material or patch for potholes or as a paving for roadways varies and is typically about 4%/w to about 8%/w of total weight. Recycled asphalt product (RAP) is typically low in AC oil content, and consistently about 4%/w. The more RAP used in place of rejuvenated shingles requires virgin AC oil to be added to create a hot mix asphalt (as shown in the examples section below). Thus, it is preferable to use more rejuvenated shingles as the source of the total oil content of the hot mix asphalt.

While processed shingles of about one inch or smaller are used by makers of hot mix asphalt in conventional methods, it is preferable that the processed shingles used according to the method of the invention be of about one-half (½) inch or smaller. The processed shingles, used in the invention, can be and are preferably processed from recycled asphalt roofing waste as disclosed in the inventor's U.S. Pat. No. 6,186,700 at Col. 5 line 7 through Col. 7, line 42, and incorporated by reference herein as if repeated herein in its entirety.

Virgin asphalt oil is contained in an asphalt oil tank 52 in communication with the hollow interior 22 of the rotating drum 22. Asphalt oil is added as necessary, to the heated gravel 14 and rejuvenated shingles 44, or added to the heated gravel and rejuvenated shingle/RAP mixture, and creates hot asphalt mix 50 with a total oil content between about 4%/w to 8%/w. Hot mix asphalt 50 with the predetermined total oil content between about 4%/w to 8%/w is dumped from the rotating drum 20 out of the dump shoot 56 into a hot storage bin 58. The hot mix asphalt is available for use in repair or paving for roadways. In FIG. 1, the drum mix apparatus is shown in a tilted position from the gravel receiving end 18 to the dumping end 58. The container 10 can be the mix drum apparatus or a mixing container used in the batch process.

In an embodiment, the method of making a hot mix asphalt, without adding virgin asphalt concrete oil, include the steps of:

a) adding gravel to a container;

b) heating and rotating the gravel in the container to a suitable temperature for creating the hot mix asphalt;

c) adding processed shingles having a predetermined %/w of AC oil to a mixing auger, and adding at least 1 to 2 parts of rejuvenating oil per 100 parts of the processed shingles to the mixer auger;

e) mixing the processed shingles and rejuvenating oil for about 10 to 45 seconds in the mixer auger to create a slurry of rejuvenated shingles; and f) releasing and mixing the slurry of rejuvenated shingles from the mixer auger in step e) into the heated gravel of step b) to form hot mix asphalt with a total oil content of between about 4%/w to 8%/w of the hot mix asphalt, without adding virgin asphalt concrete oil.

RAP can also be used as well as virgin asphalt oil to obtain the total oil content of between about 4%/w to 8%/w of the hot mix asphalt. However, use of AC oil is minimized by using more rejuvenated shingle slurry in lieu of RAP.

The total oil content can come from different sources. The range of AC oil in RAS is about 17%/w to about 30%/w (with an average of about 20%/w), and the AC oil in RAP is about 4%/w. The user determines what the AC oil content of the hot mix asphalt needs to be for a particular job, and adjusts the pounds of RAS, Rejuvenating oil, RAP, and virgin AC oil to obtain the selected content from 4%/w-8%/w of the hot mix asphalt.

Even more precisely, the user determines the AC oil content available in the RAS product. Once the user knows the AC oil content of the RAS, the user adds rejuvenating oil ("REJUV") rejuvenating oil to 10-20%/w to the total weight of AC oil in the RAS.

The user also determines the amount of AC oil in the RAP available as base material for the method. As mentioned, RAP is usually about 4%/w AC oil, and does not vary significantly. Because RAP does not contain as much AC oil as RAS, using a lot of RAP is not desirable. RAP between about 5%/w to about 50%/w of the ton of hot mix asphalt can be used in the method.

The user calculates how many pounds of RAS+REJUV having a predetermined AC oil content, to how many pounds of RAP used having a predetermined AC oil content to create a hot mix asphalt in the range of about 4%/w-8%/w for the ton of hot mix asphalt. Typically for a ton of hot mix asphalt, the pounds of oil is 80 lbs to 160 lbs.

The user can adjust the amounts to use only RAS+REJUV, or RAS+REJUV/RAP mixture to obtain the range of about 4%/w-8%/w for hot mix asphalt. The user can add AC oil, as necessary, to either combination of RAS+REJUV or RAS+REJUV/RAP mixture to obtain the range of about 4%/w-8%/w for hot mix asphalt. See Prophetic Example 4 (RAS+REJUV+AC oil—No RAP added), and Example 3 (RAS+REJUV+RAP+AC oil).

The AC oil, when is added, is in the last step of the method.

Gravel is the majority of the hot mix asphalt in the embodiments of the invention. For example, when creating a ton of hot mix asphalt, the amount of gravel makes up the bulk of the hot mix asphalt. After we know the pounds of RAS+REJUV+RAP+AC oil to obtain total oil content of about 4%/w to 8%/w for hot mix asphalt, the remaining pounds are gravel. Thus, the equation at this stage for a ton of hot mix asphalt is:

Gravel lbs=2000 lbs.−[(RAS+REJUV (rejuvenating oil)) lbs.+RAP lbs.+AC oil lbs]

For example, in the method of the invention using only RAS+REJUV with a percentage of rejuvenating oil of 3% of hot mix asphalt, then the maximum amount of gravel to be added would be 1600 pounds. See Prophetic Example 6. In addition, if emulsification oil, liquid silicone and antistrip agents are added, then the pounds of those substances are deleted from the gravel pounds.

In the Examples (below), actual and prophetic, processed shingles are referred to in the column header as RAS (recycled asphalt shingle), while hot gravel is referred to as HG.

EXAMPLES

The following hot mix asphalt was made according to the method of the invention. The RAS had an AC oil content of 20%/w, as shown below. Rejuvenating oil used was 100% oil. No RAP or additional AC oil was used in preparation of this hot mix asphalt. The user wanted a total oil content in the product of 6.40%/w, and it was achieved using the following pounds.

Example 1

|  | RAS | REJUV | RAP | HG | AC | PRODUCT TOTAL |
| --- | --- | --- | --- | --- | --- | --- |
| Lbs of Product | 400 | 48 | 0 | 1552 | 0 | 2000 |
| Lbs of Oil | 80 | 48 | 0 | 0 | 0 | 128 |
| % of oil in product | 20% | 100% | 0 | 0 | 0 | 6.40% |
| % of ingredients per ton of product | 20% | 2.4% | 0% | 77.6% | 0 | 100% |

Prophetic Examples 2-6

The following are prophetic examples that are predictive of the ranges of compositions that can be used to produce a hot mix asphalt. In these prophetic examples, we will prepare hot mix asphalt, according to the method of the invention, based upon creating a ton of hot mix asphalt, with a desired total oil content of about 6.40%/w (128 pounds of oil) in the hot mix asphalt.

In prophetic examples 2-6, the processed shingles (column-RAS) all will have an extractable oil content of 20% (AC oil) which is the average amount from processed shingles, rejuvenating oil (REJUV) will be 100% oil, and the recycled asphalt product (RAP) chosen will have an extractable oil content of 4% (AC oil), which is the average amount of RAP, to create a ton product of hot mix asphalt with 6.40%/w of total oil.

To obtain 6.40%/w total oil of a ton of hot mix asphalt using RAS, RAP, REJUV (Rejuvenating oil), AC (virgin AC oil), the total pounds of oil will need to equal 128 pounds. The pounds of gravel, RAS, RAP, REJUV, and AC oil vary based on how much of each component (as each have different oil content).

Example 2

|  | RAS | REJUV | RAP | HG | AC | PRODUCT TOTAL |
|---|---|---|---|---|---|---|
| Lbs of Product | 400 | 40 | 200 | 1360 | 0 | 2000 |
| Lbs of Oil | 80 | 40 | 8 | 0 | 0 | 128 |
| % of oil in product | 20% | 100% | 4% | 0 |  | 6.40% |
| % of ingredients per ton of product | 20% | 2% | 10% | 68% |  | 100% |

Example 3

|  | RAS | REJUV | RAP | HG | AC | PRODUCT TOTAL |
|---|---|---|---|---|---|---|
| Lbs of Product | 200 | 20 | 400 | 1328 | 52 | 2000 |
| Lbs of Oil | 40 | 20 | 16 | 0 | 52 | 128 |
| % of oil in product | 20% | 100% | 4% | 0% | 100% | 6.40% |
| % of ingredients per ton of product | 10% | 1% | 20% | 66.40% | 2.60% | 100% |

Example 4

|  | RAS | REJUV | RAP | HG | AC | PRODUCT TOTAL |
|---|---|---|---|---|---|---|
| Lbs of Product | 400 | 40 | 0 | 1552 | 8 | 2000 |
| Lbs of Oil | 80 | 40 | 0 | 0 | 8 | 128 |
| % of oil in product | 20% | 100% | 0 | 0 | 100.00% | 6.40% |
| % of ingredients per ton of product | 20% | 2% | 0 | 77.60% | 0.40% | 100% |

Example 5

|  | RAS | REJUV | RAP | HG | AC | PRODUCT TOTAL |
|---|---|---|---|---|---|---|
| Lbs of Product | 200 | 10 | 400 | 1328 | 62 | 2000 |
| Lbs of Oil | 40 | 10 | 16 | 0 | 62 | 128 |
| % of oil in product | 20% | 100% | 4% | 0% | 100% | 6.40% |
| % of ingredients per ton of product | 10% | .50% | 20% | 66.40% | 3.10% | 100% |

Example 6

|  | RAS | REJUV | RAP | HG | AC | PRODUCT TOTAL |
|---|---|---|---|---|---|---|
| Lbs of Product | 340 | 60 | 0 | 1600 | 0 | 2000 |
| Lbs of Oil | 68 | 60 | 0 | 0 | 0 | 128 |
| % of oil in product | 20% | 100% | 0 | 0 | 0% | 6.40% |
| % of ingredients per ton of product | 20% | 3% | 0 | 80.00% | 0% | 100% |

The following are prophetic charts 1-5 to illustrate the pounds and range of compositions that can be prepared according to the invention. It is merely illustrative, and the data can be extrapolated easily to cover numerous compositions according to the invention.

The range of total oil content to create hot mix asphalt is 4%/w to 8%/w. That is 80 lbs to 160 lbs per ton of hot mix asphalt. The following is a chart showing the corresponding pounds within the range of 4%/w to 8%/w when creating a ton of hot mix asphalt.

Prophetic Chart 1

| Total Oil Content (%/w). | Oil Lbs. |
| --- | --- |
| 8% | 160 |
| 7.5% | 150 |
| 7% | 140 |
| 6.5% | 130 |
| 6% | 120 |
| 5.5% | 110 |
| 5% | 100 |
| 4.5% | 90 |
| 4% | 80 |

The AC Oil content of the RAS (also referred to as processed shingles), used in the prophetic examples, is 20%/w, which is a common (or average) content of RAS products. Using this predetermined amount, we prepared a chart showing the pounds of the RAS that correspond to pounds of AC Oil, and adding the minimum rejuvenating oil of at least 1%/w would be about:

Prophetic Chart 2

| RAS (processed shingles) Lbs. | AC oil Lbs. (20% w) | 1-2%/w REJUV Lbs |
| --- | --- | --- |
| 500 | 100 | 5-10 |
| 400 | 80 | 4-8 |
| 300 | 60 | 3-6 |
| 200 | 40 | 2-4 |
| 100 | 20 | 1-2 |

The AC Oil content of the RAP (also referred to as recycled asphalt product), used in the prophetic examples, is 4%/w, which is a common content of RAP. Using this predetermined amount, we prepared a chart showing the pounds of the RAP that correspond to pounds of AC oil. This makes type of chart makes it easy to determine quantity to add to obtain the acceptable range.

Prophetic Chart 3

| RAP (Recycled Asphalt Product) Lbs. | AC oil Lbs. (4% w) |
| --- | --- |
| 500 | 20 |
| 400 | 16 |
| 300 | 12 |
| 200 | 8 |
| 100 | 4 |

Additional prophetic examples, are included below, showing the preparation of charts when a predetermined AC Oil is found for a base material along the range of about 16%/w to about 33%/w of AC oil for processed shingles.

A variety of prophetic examples have been prepared above showing the rejuvenated shingles (processed shingles+rejuvenating oil), RAP, and AC oil depending on how much extractable oil is available from the RAS+rejuvenating oil and RAP used in the hot mix asphalt. The rejuvenating oil is used in at least 1 part rejuvenating oil to about 100 parts of the RAS, which is at least 1%/w of RAS.

Additional AC oil can be added to obtained the desired percentage within a range of about 4%/w to about 8%/w of the ton of hot mix asphalt. However, in the prophetic examples above, we used 6.40%/w for the total content of oil. We then determined the gravel amounts necessary to complete the hot mix asphalt.

The present invention may be embodied in other specific forms without departing from the spirit of essential attributes thereof; therefore, the illustrated embodiment should be considered in all respects as illustrative and not restrictive, reference being made to the appended claims rather than to the foregoing description to indicate the scope of the invention.

What is claimed is:

1. A method of making hot mix asphalt, without adding virgin asphalt content oil, comprising the steps of:
    a) adding gravel to a container;
    b) heating and rotating the gravel in the container to a suitable temperature for creating hot mix asphalt;
    c) adding processed shingles having a predetermined %/w of AC oil to a mixing auger outside the container and extending into the container, and adding at least 1 part of rejuvenating oil per 100 parts of the processed shingles to the mixer auger;
    d) mixing the processed shingles and rejuvenating oil for about 10 to 45 seconds in the mixer auger to create a slurry of rejuvenated shingles; and
    e) releasing and mixing the slurry of rejuvenated shingles from the mixer auger extending into the container in step d) into the heated gravel of step b) to form hot mix asphalt with a total oil content of between about 4%/w to 8%/w of the hot mix asphalt, without adding virgin asphalt concrete oil.

2. The method of claim 1 wherein the container is a drum mix apparatus.

3. The method of claim 1 wherein the container is a component of a batch plant.

4. The method of claim 1 further comprising the step of adding RAP with a predetermined %/w of AC oil to step b) heating and rotating gravel in the container to a suitable temperature for creating hot mix asphalt.

* * * * *